(No Model.)

J. KOPF.

FISHING REEL.

No. 318,190. Patented May 19, 1885.

2 Sheets—Sheet 1.

Witnesses:
Louis M. F. Whitehead.
C. L. Sundgren

Inventor:—
John Kopf.
by his Att'ys
Brown & Hall (No Model.)

J. KOPF.

FISHING REEL.

2 Sheets—Sheet 2.

No. 318,190.

Patented May 19, 1885.

Witnesses:—
Louis M. T. Lohitehead.
C. E. Sundgren

Inventor:—
John Kopf
by his attys.
Brown & Hall

UNITED STATES PATENT OFFICE.

JOHN KOPF, OF BROOKLYN, NEW YORK, ASSIGNOR OF ONE-HALF TO THOMAS B. MILLS, OF SAME PLACE.

FISHING-REEL.

SPECIFICATION forming part of Letters Patent No. 318,190, dated May 19, 1885.

Application filed August 11, 1884. (No model.)

*To all whom it may concern:*

Be it known that I, JOHN KOPF, of the city of Brooklyn, in the county of Kings and State of New York, have invented a new and useful Improvement in Fishing-Reels, of which the following is a specification.

My invention relates to multiplying-reels, in which the spool may be thrown out of gear or disengaged from the handle, so that in casting the momentum of the handle will not act to continue the unwinding of the line after the hook strikes the water, or does not act to make the reel overrun in casting.

The invention consists in the combination, with a spool and a pinion thereon, of a lever fulcrumed at one end and capable of movement at the other or free end, a pinion or wheel and its shaft journaled in said lever between its ends, and carrying the handle and a throwing-off device acting upon the free end of the lever and serving to move the lever and disengage the handle-wheel from or engage said wheel with the spool-pinion. The said throwing-off device preferably extends through the cap or cap-like portion of the head of the reel, and is operated at the face of the cap or head, and a throwing-off device so arranged and operated, in connection with the other above-mentioned elements of the combination, also constitutes a feature of my invention.

The invention also consists in the combination, with a reel-spool and a pinion thereon, of a lever fulcrumed at one end and having a yoke at its other or free end, a pinion or wheel and its shaft journaled in said lever between its ends and carrying the handle, and a shaft extending through the reel-cap or cap-like portion of the head, and provided with a cam operating in the yoke of the lever, whereby by turning said shaft the lever may be shifted to disengage its wheel from or engage it with the spool-pinion.

The momentum of the spool itself in casting may be overcome by the thumb, but an adjustable brake, acting upon the spool, is sometimes used; and my invention further consists in the combination, in a multiplying-reel, with the spool and its operating mechanism, of a brake-spring and novel means for applying it, as hereinafter particularly described, and pointed out in the claims.

Figure 1:
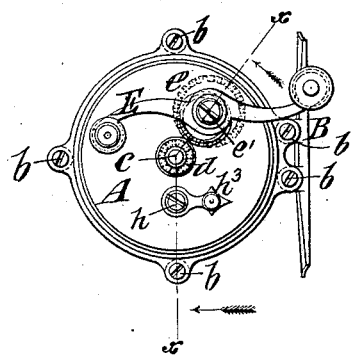
Figure 2:
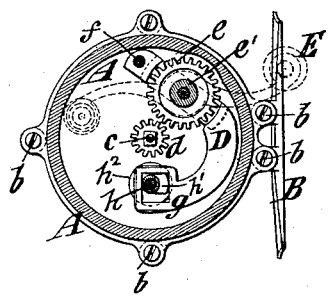
Figure 3:
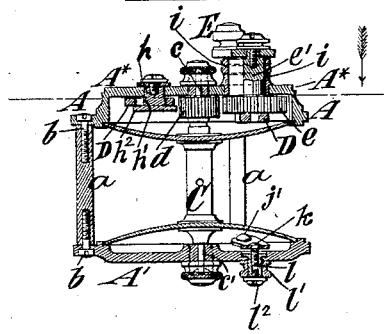
Figure 4:
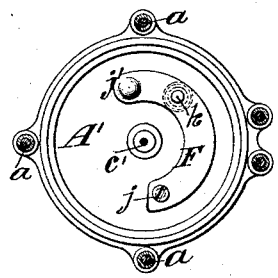
Figure 5:
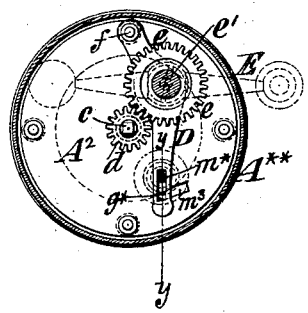
Figure 6:
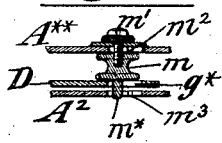

In the accompanying drawings, Figure 1 is a side view of a reel embodying my invention. Fig. 2 is a sectional view, the cap or cap portion of the head being removed. Fig. 3 is a section on the line $x\,x$, Fig. 1. Fig. 4 is an interior or inside view of one of the heads, including my improved brake. Fig. 5 represents a reel, the cap of which is removed, and which represents a modification of my invention; and Fig. 6 is a sectional view on the line $y\,y$, Fig. 5, of a portion of the reel there shown.

Similar letters of reference designate corresponding parts in all the figures.

Referring first to Figs. 1 to 4, inclusive, A A' designate the heads of the reel, which are held at a proper distance apart and in proper relation to each other by pillars $a$, and a base piece or plate, B, to which said heads are connected by screws $b$ in the usual way or by any other suitable means. The head A is constructed with a cap-like or recessed portion, A*, which contains the multiplying-gearing, as hereinafter described, and at this head the reel is operated.

C designates the spool, having journals $c\,c'$, which are supported in bearings provided in the heads A A', and which is of ordinary construction. On the spool-journal $c$ is secured a pinion, $d$, through which the spool is turned, and which receives motion from a gear-wheel, $e$, secured upon a shaft, $e'$.

D designates a lever. (Here shown as curved and arranged in the recessed or cap-like head A A*.) The lever D is fulcrumed at $f$ to the head A, and at its other or free end is formed with a yoke, $g$, as best shown in Fig. 2. To the lever D, between its ends, is attached the shaft $e'$, and to the said shaft, outside the head A, is attached the winding-handle E.

From the above description it will be understood that by moving the free or yoke end of the lever D the said lever may be swung on its fulcrum $f$ and the wheel $e$ moved into or out of gear with the pinion $d$. In this way the wheel may be engaged with or disengaged from the pinion $d$ and the driving mechanism.

The device for throwing off the lever D and the wheel carried by it is here shown as consisting of a short shaft, $h$, extending through and supported in the head A, and having on its inner end a cam, $h'$, which engages with the yoke $g$, and a flange, $h^2$, which overlaps the portion of lever around the yoke, and so holds the lever in proper relation to the cam and prevents it slipping off the cam. As represented in Fig. 2, the cam has been operated to move the lever D in a direction to carry the wheel $e$ out of gear with the pinion $d$, as shown.

To the outer end of the short shaft $h$ is attached a handle or index-pointer, $h^3$, by which the shaft may be turned.

The arrangement for shifting the wheel $e$ herein described is very desirable, because the wheel and its carrying-lever are moved positively both to place the wheel $e$ in engagement with the pinion $d$ and to free the wheel from such engagement. The shaft $e'$, carrying the wheel $e$ and handle E, is fitted to a slot or elongated aperture, $i$, in the head A, as shown in Fig. 3, and hence freedom for the movement of said wheel and lever is thereby secured.

In casting with a multiplying-reel having the operating mechanism thrown off, the spool may be retarded or its momentum arrested by the thumb; but for this purpose I may make use of a brake. (Shown in Figs. 3 and 4.)

The brake F consists of a flat spring. (Here shown as curved in the direction of its width.) This brake-spring is fastened at its one end, $j$, to the inner side of the head A', and at its other end, $j'$, bears upon the flange of the spool C. The resilience of this brake-spring carries it against the spool when not controlled, and thereby acts to stop the spool and overcome the momentum which it acquires in casting.

In the spring F is fixed a screw, $k$, which extends through the head A', and is fitted to a nut, $l$, capable of turning in the head A'. This nut is flanged at its inner end, and is introduced through an aperture in said head from the inner side of the head, and on the portion of the nut which projects beyond the nut $l$ is secured a collar or thumb-piece, $l'$, which is held in place by a screw, $l^2$. The nut may be turned by its hand-piece or collar $l'$, and as it is held against axial movement in the head by the collar or thumb-piece $l'$ and the flange of the nut $l$, the turning of the nut will move the screw $k$ longitudinally, and so put on or take off the brake. By turning the nut in one direction the brake will be applied, and by turning it in the other direction the brake will be taken off.

The pressure of the brake may be lightly applied before casting, and increased, if desirable, after the cast. The adjustable brake is also useful for regulating the running out of the line in playing a fish, the brake being applied according to the strength of the fish.

I do not claim, broadly, an adjustable brake for a reel-spool as of my invention. The screw $k$ in my brake will preferably be of such length that the nut may be turned sufficiently to disengage it from the screw, and the spring-brake will then act with its full power on the spool. The spool will not, however, allow the brake to spring away far enough to carry the screw $k$ out of reach of the nut, and as soon as the nut is turned in the proper direction it will catch hold of the screw $k$, and again act to take off the power of the brake-spring.

In the example of my invention shown in Figs. 5 and 6 there is employed a lever, D, fulcrumed at one end, $f$, and having mounted upon it a wheel, $e$, and its shaft and operating-handle $e'$ E.

By moving the free end of the lever the wheel $e$ may be engaged with or disengaged from the pinion $d$ on the spool-journal $c$.

In this example of my invention I have represented a head or side plate, $A^2$, adjacent to the cap $A^{**}$, and the lever D is operated by a throwing-off device, consisting of a slide, $m$, having a pin, $m^*$, extending through a slot, $g^*$, in the free end of the lever D. With the slide $m$ is connected a screw or pin, $m'$, extending through an L-shaped slot or opening, $m^2$, in the cap $A^{**}$. As here shown, the pin $m^*$ also extends through a corresponding L-shaped slot, $m^3$, in the head $A^2$.

When the wheel $e$ is to be maintained in engagement with the pinion $d$, the pin $m^*$ and the pin or screw $m'$ are in the position shown in Fig. 5, they being in those parts of the L-shaped slots $m^2$ $m^3$ which are parallel with the slot $g^*$ in the lever D. When the lever is to be moved to throw off the operating mechanism, the pin and slide $m'$ $m$ are slid outward or toward the periphery of the heads till opposite the transverse portions of the slots $m^2$ $m^3$, into which they enter and allow of the lever being swung to carry the wheel $e$ out of engagement with the pinion $d$. A reverse movement of the slide and pin $m$ $m'$ will return the wheel $e$ into engagement with the pinion $d$.

What I claim as my invention, and desire to secure by Letters Patent, is—

1. The combination, with a spool and a pinion thereon, of a lever fulcrumed at one end and movable at the other or free end, a wheel and its shaft journaled in said lever between its ends and carrying the handle and a throwing-off device, substantially as described, connected with the free end of said lever and operating as described, substantially as and for the purpose set forth.

2. The combination, with a spool and a pinion thereon, of a lever fulcrumed at one end and movable at the other or free end, a wheel and its shaft journaled in said lever between its ends and carrying the handle, and a throwing-off device, substantially as described, connected with the free end of said lever and extending through the cap or cap-like portion of the reel-head, substantially as and for the purpose set forth.

3. The combination, with a reel-spool and a pinion thereon, of a lever fulcrumed at one end and having at its free end a yoke, a wheel and its shaft journaled in said lever between its ends and carrying a handle, and a shaft extending through the cap portion of the reel, capable of operation at the face of such portion and provided with a cam working in said yoke, substantially as and for the purpose set forth.

4. The combination, with the spool and head of a reel, of a brake-spring, F, attached to the inner side of the head, and a screw and nut, k l, for the brake, the screw being attached to the spring and the nut being held against movement lengthwise of its axis in the head, substantially as set forth.

JOHN KOPF.

Witnesses:
FREDK. HAYNES,
EMIL SCHWARTZ.